United States Patent
Coulter (10) Patent No.: US 10,063,270 B2
(45) Date of Patent: *Aug. 28, 2018

(54) CASE FOR COOLING AN ELECTRONIC DEVICE VIA AN ENDOTHERMIC REACTION

(71) Applicant: Honeywell Federal Manufacturing & Technologies, LLC, Kansas City, MO (US)

(72) Inventor: Joshua Oliver Coulter, Kansas City, MO (US)

(73) Assignee: Honeywell Federal Manufacturing & Technologies, LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/459,716

(22) Filed: Mar. 15, 2017

(65) Prior Publication Data

US 2017/0187411 A1    Jun. 29, 2017

Related U.S. Application Data

(63) Continuation of application No. 14/957,650, filed on Dec. 3, 2015, now Pat. No. 9,608,686.

(51) Int. Cl.
*H04B 1/036* (2006.01)
*H04B 1/3888* (2015.01)
*F25D 5/02* (2006.01)

(52) U.S. Cl.
CPC .......... *H04B 1/3888* (2013.01); *F25D 5/02* (2013.01)

(58) Field of Classification Search
CPC ........ H04B 1/3888; H04B 1/036; H04B 1/03; H04B 1/08; H05K 7/20509; H04M 1/026
See application file for complete search history.

(56) References Cited

U.S. PATENT DOCUMENTS

| 5,184,470 A * | 2/1993 | Moser ................ F25D 5/00 |
| | | 62/259.2 |
| 6,020,040 A | 2/2000 | Cramer |

(Continued)

FOREIGN PATENT DOCUMENTS

| CN | 103618811 | 3/2014 |
| CN | 103832349 | 6/2014 |

OTHER PUBLICATIONS http://www.droidforums.net/threads/what-about-a-cooling-case.128983; Apr. 28, 2011.

*Primary Examiner* — Andrew Wendell
(74) *Attorney, Agent, or Firm* — Hovey Williams LLP (57) ABSTRACT

A case for cooling a portable electronic device, the case including a housing and a removable cartridge. The housing holds the electronic device and has a cartridge compartment for retaining the removable cartridge. The removable cartridge includes a set or sets of compartments for retaining substances configured to generate an endothermic reaction when mixed or combined. Pairs of compartments are separated by a divider configured to be selectively breached. The duration of the cooling effect may be extended by periodically breaching dividers of additional compartment pairs. The magnitude of the cooling effect may be increased by breaching multiple compartment pairs at once. The case may also include electronic components for monitoring the temperature of the electronic device and automatically initiating an endothermic reaction when the temperature reaches a predetermined threshold.

18 Claims, 4 Drawing Sheets

(56) References Cited

U.S. PATENT DOCUMENTS

| | | |
|---|---|---|
| 6,438,965 B1 | 8/2002 | Liao |
| 7,303,328 B2 | 12/2007 | Faraldi |
| 8,539,777 B2 | 9/2013 | Henry |
| 9,608,686 B1 * | 3/2017 | Coulter ................ H04B 1/3888 |
| 2003/0042004 A1 * | 3/2003 | Novotny ................ F25D 19/00 |
| | | 165/80.2 |
| 2005/0160743 A1 | 7/2005 | Dunwoody |
| 2011/0064983 A1 | 3/2011 | Yokoyama |

* cited by examiner

CASE FOR COOLING AN ELECTRONIC DEVICE VIA AN ENDOTHERMIC REACTION

RELATED APPLICATIONS

This patent application is a continuation and claims priority benefit with regard to all common subject matter, of earlier-filed U.S. patent application Ser. No. 14/957,650, filed on Dec. 3, 2015, and entitled "CASE FOR COOLING AN ELECTRONIC DEVICE VIA AN ENDOTHERMIC REACTION". The identified earlier-filed non-provisional patent application is hereby incorporated by reference in its entirety into the present application.

BACKGROUND

Mobile phones and other portable electronic devices occasionally overheat and fail to operate properly, especially when used in hot environments. Cooling cases with fans, liquid cooling loops, heat sink fins, and/or other cooling mechanisms for drawing heat away from electronic devices have been developed for preventing such overheating. Unfortunately, these cooling mechanisms are often bulky, complicated, and/or expensive and typically require batteries or other sources of electricity. Additionally, heat sinks are ineffective when the ambient temperature is higher than or equal to the temperature of the electronic devices. For example, some portable electronic device holders draw heat away from the electronic devices but do not reduce the temperature near the electronic devices below the ambient temperature.

SUMMARY OF THE INVENTION

Embodiments of the present invention solve the above-mentioned problems and provide a distinct advance in the art of cooling cases for portable electronic devices. More particularly, the present invention provides a case for selectively cooling a portable electronic device via a plurality of separate endothermic reactions between substances retained in the case.

An embodiment of the cooling case broadly includes a housing and a cartridge. The housing may include a primary body with a device cavity for retaining the electronic device and a cartridge chamber for retaining the cartridge. The cartridge chamber may extend substantially parallel to the device cavity for optimizing the cooling effects of the endothermic reaction.

The cartridge retains two or more substances for creating an endothermic reaction and may include a first set of compartments, a second set of compartments, and a partition. The compartments may be paired so as to separately hold first and second substances. The partition separates all of the compartments and may include a selectively breachable divider extending between paired compartments.

Use of the above-described case will now be summarized. First, one of the partition dividers may be selectively breached when the temperature of the electronic device becomes too high. For example, a user may press his finger or a tool against the desired divider until it is breached. The first and second substances in the corresponding pair of compartments may then mix or combine so as to generate an endothermic reaction. The endothermic reaction will create a thermal gradient between the case and the electronic device such that heat is transferred or drawn from the electronic device to the case, thereby cooling the electronic device. The duration and magnitude of the endothermic reaction, and hence the cooling effect, may be limited to the amounts of the first and second substances in the corresponding compartments and indirectly to the size of the corresponding compartments. As such, if continuing to cool the electronic device is required as the endothermic reaction nears or reaches completion, another divider corresponding to additional compartments may be selectively breached. Similarly, if the electronic device needs increased cooling, multiple dividers of the partition may be selectively breached simultaneously. If each set of first and second compartments are different sizes, the duration and magnitude of the endothermic reaction and the resulting cooling effect may be selected by puncturing larger or smaller pairs of compartments. Thus, the duration and magnitude of the cooling effect may be selectively controlled.

When all of the substances have undergone an endothermic reaction, the cartridge may be removed from the cartridge chamber of the housing and a new cartridge may be inserted into the cartridge chamber for further cooling the electronic device.

Another embodiment of the present invention includes a breaching mechanism for breaching the partition dividers of the cartridge in response to an electronic signal. The breaching mechanism may include a set of pins, cutting edges, or other similar members configured to be selectively actuated towards the dividers until the dividers are torn, repositioned, punctured, or otherwise compromised.

The breaching mechanism may be activated by an electronic signal received via a transceiver, external electronic connection, or integrated input such as a push-button positioned on the housing. For example, the breaching mechanism may initiate an endothermic reaction upon receiving a signal from the electronic device that its internal temperature is too high. Alternatively, the signal may originate from a temperature sensor in the housing of the case.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning now to FIGS. 1-5, a case 10 for cooling an electronic device 100 is illustrated. The case 10 broadly comprises a housing 12 and a cartridge 14. The housing 12 protects the electronic device 100 and may include a primary body 16, a device cavity 18 for receiving the electronic device 100 therein, and a cartridge chamber 20 for receiving the cartridge 14 therein.

Figure 1:
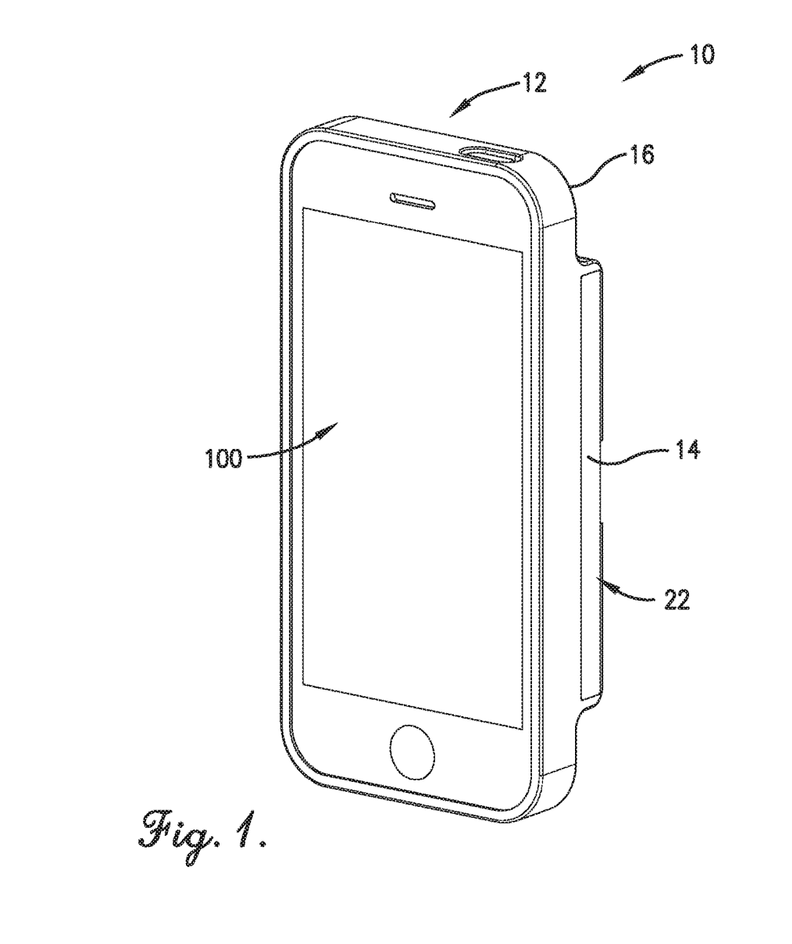
FIG. 1 is a perspective view of a cooling case constructed in accordance with an embodiment of the present invention and shown with a mobile phone contained therein.
Figure 2:
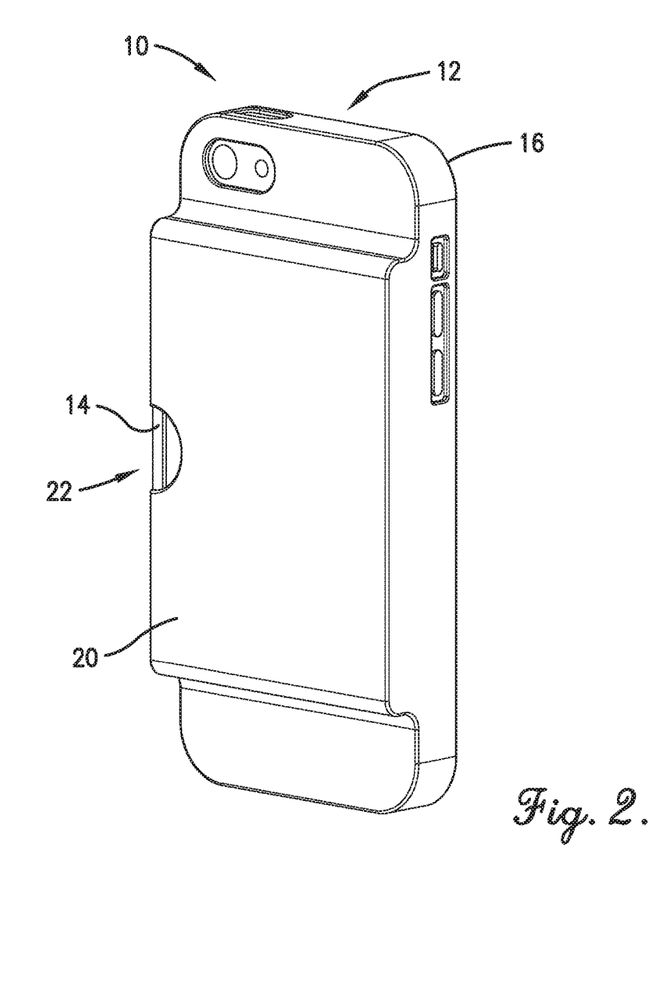
FIG. 2 is a rear perspective view of the case of FIG. 1.
Figure 3:
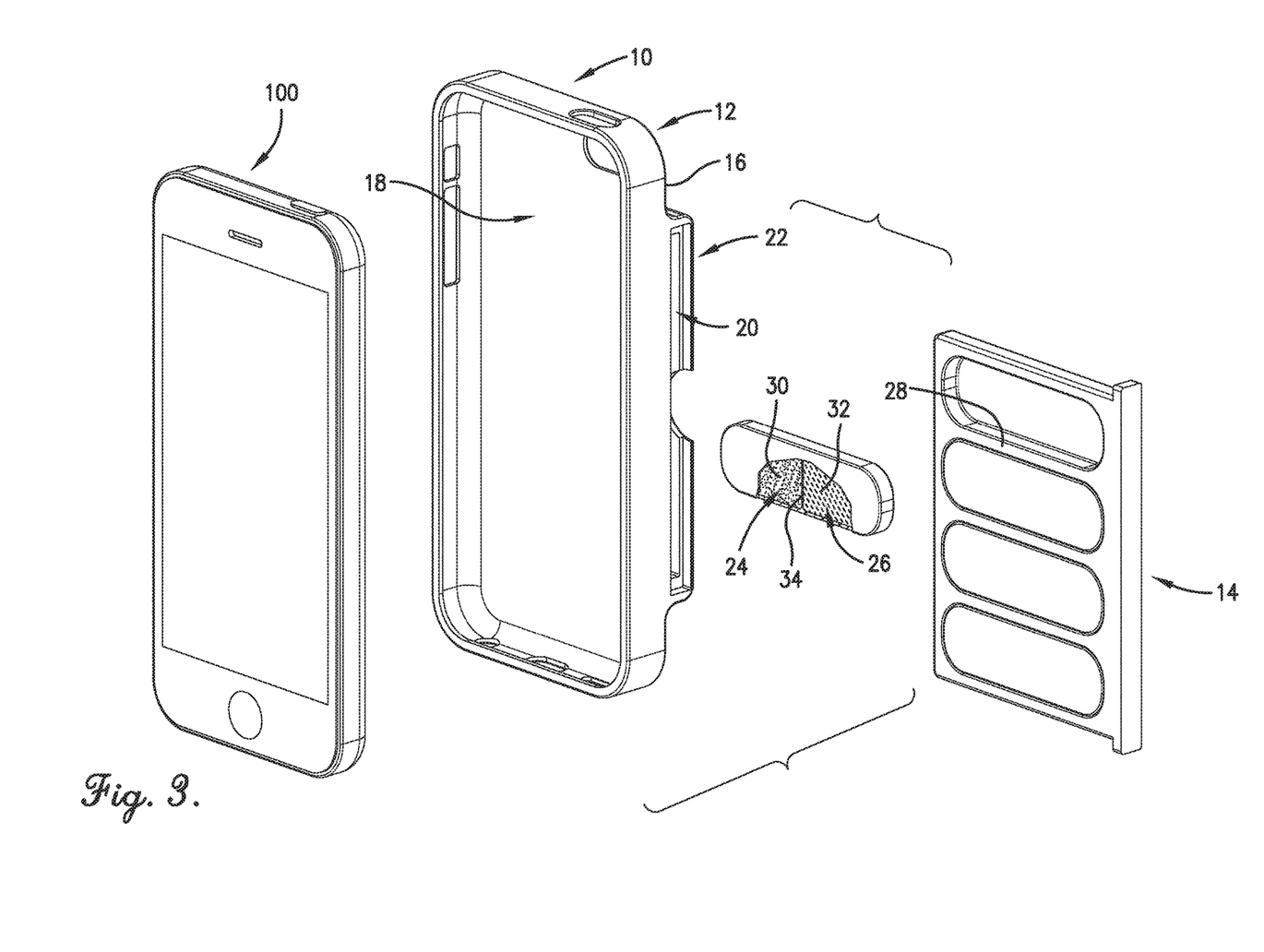
FIG. 3 is an exploded view of the case of FIG. 1.

The primary body 16 may include a back section 22 and a lip or flange extending outwardly therefrom so as to form the device cavity 18, described in more detail below. The primary body 16 may also include one or more slits and/or openings for providing access to controls, cameras, and other components of the electronic device 100 and ergonomic contours or grips for allowing a user to better grip the electronic device 100. The primary body 16 may be formed of silicon rubber, foam, or any other material with insulating properties for insulating the electronic device 100 and cartridge 14 from ambient heat.

In one embodiment the primary body 16 may be formed of a heat conductive material such as metal near the device cavity 18 so as to conduct heat from the electronic device and an insulating material further from the device cavity 18 so as to minimize ambient heat absorption. In other embodiments, the back section 22 may be formed of a single conductive material but lined with an insulating material on the outside or formed of a single insulating material but lined with a conductive material on the inside. The primary body 16 may also be at least partially transparent or translucent so that a user may view how much of the cooling substances, and hence cooling potential, remains in the cartridge 14. In some embodiments, the primary body 16 may further include depressible buttons or markings so that a user may know where to press or push against the case 10 to initiate endothermic reactions, as described in more detail below.

The device cavity 18 may have an open front so that a user may access a display of the electronic device 100. The device cavity 18 may match the shape of the electronic device 100 so that little to no air may fit between the device cavity 18 and the electronic device 100. This may improve heat transfer between the electronic device 100 and the cartridge 14, as described below. The device cavity 18 may be sized and shaped according to the particular electronic device 100 (e.g., smartphone, smartwatch, tablet, laptop, calculator, portable navigation receiver, voltmeter, ohmmeter, etc.). In one embodiment, the device cavity 18 is configured to fit an Apple iPhone® or a mobile phone made by RiMM®, Samsung®, HTC®, Motorola®, or Palm®. The device cavity 18 can also be configured to fit other types and versions of portable electronic devices without departing from the scope of the present invention.

The cartridge chamber 20 may be positioned in the back section 22 of the primary body 16 and may extend parallel with the device cavity 18. This may further improve the heat transfer between the electronic device 100 and the cartridge 14, as described below. The cartridge chamber 20 may be open-ended for removing and replacing the cartridge. Alternatively, the cartridge chamber 20 may include a cover, lid, cap, or other enclosure for retaining the cartridge 14 in the cartridge chamber 20. The cartridge chamber 20 may be of any shape and size to approximately match the shape and size of the cartridge 14 (described below). Alternatively, a strap, Velcro®, adhesive strip, or other securement device may be positioned in or over the back section 22 for securing the cartridge 14 therein.

Figure 4:
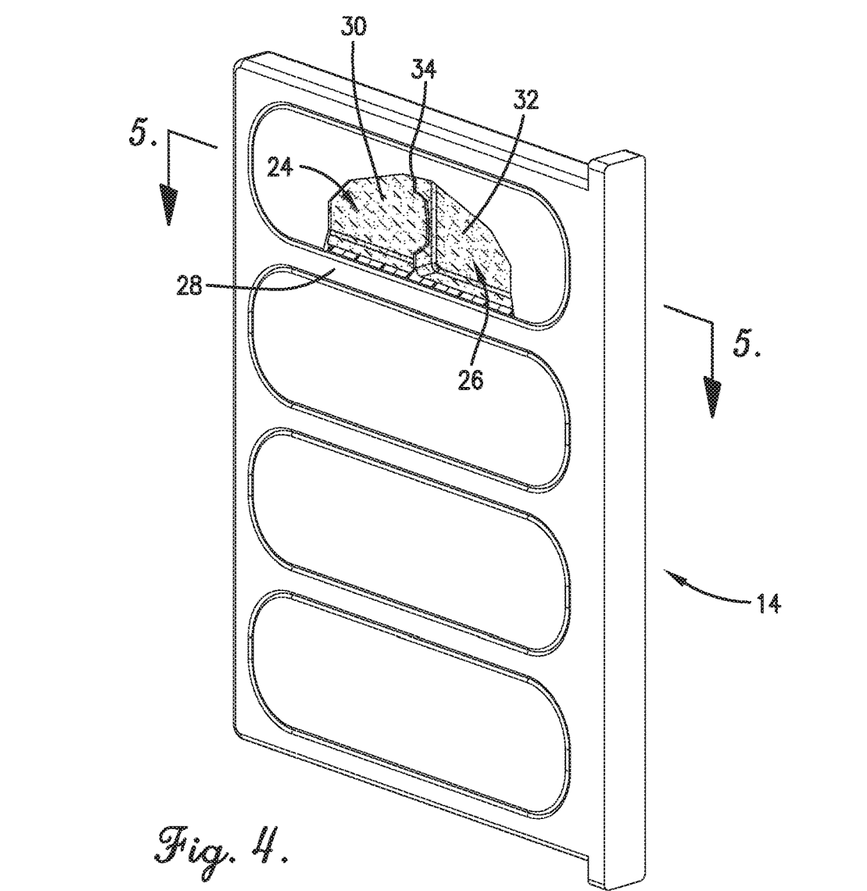
FIG. 4 is an enlarged perspective view of a cartridge of the case of FIG. 1 with the divider between paired compartments breached.
Figure 5:
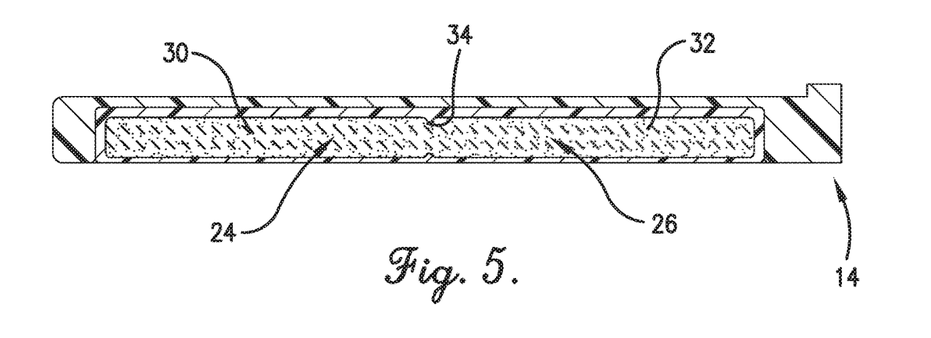
FIG. 5 is a cut-away view of the compartments of the cartridge of FIG. 4.

The cartridge 14 produces an endothermic chemical reaction for cooling the electronic device 100 and may include a first plurality of compartments (e.g., compartment 24), a second plurality of compartments (e.g., compartment 26), and a partition 28, described below. The cartridge 14 may be a flexible bag or pouch, a rigid tray or insert, or any other similar component. The cartridge 14 may be removable and replaceable and thus may be formed of recyclable or disposable material. Alternatively, the cartridge 14 may be embedded or enclosed in, or unitary with the housing 12 as a single-use cartridge. The cartridge 14 may also be mounted externally on the housing 12 instead of within the cartridge chamber 20.

The first plurality of compartments 24 retain a first substance 30 therein and may be arranged in a rectangular array, circular array, random pattern, or any other arrangement. The first plurality of compartments 24 may be rectangular shaped, square shaped, tube shaped, or any other suitable shape and may be sized as needed for retaining predetermined amounts of the first substance 30 therein. Each compartment of the first plurality of compartments 24 may be of equal size or may have different sizes.

The second plurality of compartments 26 retain a second substance 32 therein and may be positioned adjacent to corresponding ones of the first plurality of compartments 24. The second plurality of compartments 26 may be arranged in rectangular array, circular array, random pattern, or any other arrangement similar to the first plurality of compartments 24. The second plurality of compartments 26 may also be rectangular shaped, square shaped, tube shaped, or any other suitable shape and may be sized as needed for retaining predetermined amounts of the second substance 32 therein. Each compartment of the second plurality of compartments 26 may be of equal size or may have different sizes.

The first and second plurality of compartments 24, 26 may be arranged in front and back, top and bottom, or side-to-side pairs. The first and second compartments 24, 26 in each pair may be the same size or different sizes, depending on the substance ratio required for creating an endothermic reaction, as described below.

The partition 28 separates the compartments from each other and may include a plurality of dividers such as divider 34 for separating pairs of compartments. The dividers may be a thin membrane, diaphragm, or seal configured to be punctured, torn, sheared, dissolved, or removed. For example, the divider 34 may be a plastic film or strip extending between a pair of compartments. Alternatively, the divider 34 may be a thin rigid plate or layer configured to be snapped, cracked, or otherwise broken.

The first and second substances 30, 32 create an endothermic reaction when mixed or combined and may be water and ammonium nitrate, ammonium sulfurate, potassium nitrate, or sodium thiosulfate, or any other combination of chemicals or substances for creating the endothermic reaction. The first and second substances 30, 32 may also be in any suitable quantity.

Use of the case 10 will now be described in more detail. First, the electronic device 100 may be placed in the device cavity 18 of the housing 12. Cooling of the electronic device 100 may be desired if the temperature of the electronic device 100 is too high due to ambient temperatures and/or due to excessive heat production of the electronic device 100. To cool the electronic device 100, one of the dividers (e.g., divider 34) of the partition 28 dividing a pair of the first and second plurality of compartments 24, 26 may be selectively breached by puncturing or breaking the divider, as described above. For example, the user may press his finger or a tool against the divider 34 until the divider 34 is breached (see FIGS. 4 and 5). The first and second substances 30, 32 in the corresponding pair of compartments 24, 26 may then mix or combine so as to generate an endothermic reaction. The endothermic reaction may create a thermal gradient between the case 10 and the electronic device 100 such that heat is transferred or drawn from the electronic device 100 to the case 10, thereby cooling the electronic device 100. The duration and magnitude of the endothermic reaction, and hence the cooling effect, may be limited to the amounts of the first and second substances 30, 32 in the corresponding compartments 24, 26 and indirectly to the size of the corresponding compartments. As such, if continuing to cool the electronic device 100 is required as the endothermic reaction nears or reaches completion, another divider of the partition 28 corresponding to additional compartments may be selectively breached. Similarly, if the electronic device 100 needs increased cooling, multiple dividers of the partition may be selectively breached simultaneously. If each set of first and second compartments 24, 26 are different sizes, the duration and magnitude of the endothermic reaction and the resulting cooling effect may be selected by puncturing larger or smaller pairs of compartments. Thus, the duration and magnitude of the cooling effect may be selectively and completely controlled.

When all of the first and second substances 30, 32 have undergone an endothermic reaction, the cartridge 14 may be removed from the cartridge chamber 20 of the housing 12 and a new or unused cartridge 14 may be inserted into the cartridge chamber 20 for further cooling. Alternatively, the compartments themselves (e.g., compartments 24, 26) may be removable from the cartridge 14 and replaced with new compartments filled with unspent substances.

The above-described case 10 provides several advantages over conventional electronic device cases. For example, the duration and magnitude of the cooling effect may be controlled by selectively and/or periodically breaking one or more dividers of the partition 28. The housing 12 may be formed of insulating material and thus may protect the electronic device 100 from warm ambient temperatures and improve the cooling effect of the endothermic reaction. The case does not require external power to cool the electronic device 100. The cartridge 14 may also be replaceable.

Figure 6:
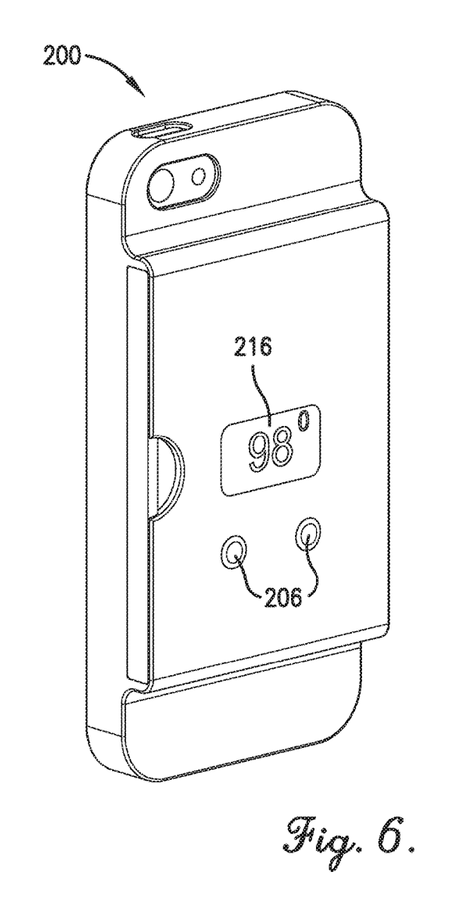
FIG. 6 is a rear perspective view of a case for cooling an electronic device, as constructed in accordance with another embodiment of the present invention.
Figure 7:
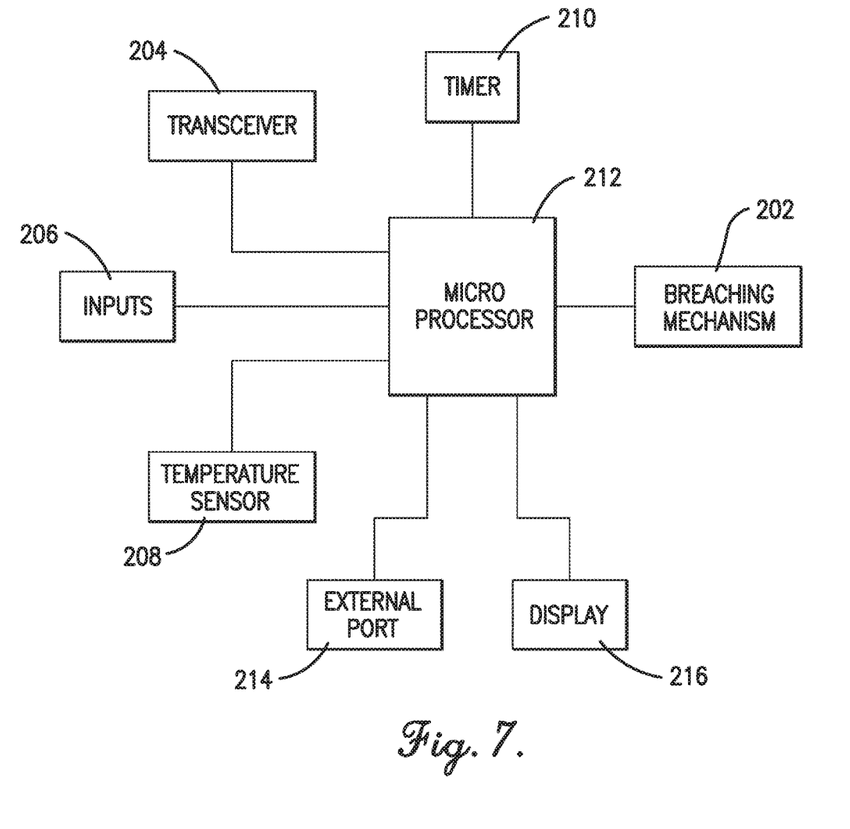
FIG. 7 is a schematic illustration of the electronic components of the cooling case of FIG. 6.

Turning to FIGS. 6 and 7, another embodiment of the present invention is a case 200 similar to the case 10 described above except that the case 200 may further comprise a breaching mechanism 202, a transceiver 204, one or more inputs 206, a temperature sensor 208, a timer 210, and a microprocessor 212.

The mechanism 202 may include one or more protrusions, points, or edges configured to pierce or otherwise selectively breach a divider of the partition. The mechanism 202 may be manually pushed or pressed or may include an actuator triggered via an electric current, impulse, or signal, a magnetic reaction, or a similar stimulant. The mechanism 202 may alternatively release a chemical that dissolves one of the dividers of the partition or apply a pressure within the compartments until the divider is breached.

The transceiver 204 may receive a signal from the electronic device 100, a remote control, or other source representing an instruction to breach a divider of the partition and may be electronically coupled to the mechanism so that the mechanism 202 is activated when the transceiver 204 receives the signal. The transceiver 204 may operate via radio waves, infrared signal, Bluetooth, near field communication (NFC), or any other wireless communication protocol.

The one or more inputs 206 may provide input from a user and may be electronically coupled with the mechanism 202 such that the mechanism 202 selectively breaches one or more dividers of the partition. For example, the one or more inputs 206 may be selectively pressed depending on which and how many dividers of the partition to breach. The one or more inputs 206 may be push-buttons, switches, pressure sensors, or any other suitable inputs.

The temperature sensor 208 may sense a temperature near the electronic device 100 and may generate a signal representative of the temperature near the electronic device 100. The temperature sensor 208 may be a thermistor, thermocouple, resistive sensor, or any other suitable temperature sensor.

As an alternative to the integrated temperature sensor 208, the case 200 may include an electronic connection 214 configured to electronically couple the mechanism 202 to an external circuit or control system (e.g., the electronic device 100 itself) for activating the mechanism 202 when the external circuit or control system sends a representative signal thereto. For example, the electronic connection 214 may electronically couple the mechanism 202 to an internal temperature sensor 208 of the electronic device 100 such that the case 200 cools the electronic device 100 according to the internal temperature of the electronic device 100 instead of an external temperature near the electronic device 100. This may result in more accurate temperature control of the electronic device 100. The electronic connection 214 may be a USB port, ⅛th inch terminal, proprietary port, or any other suitable connection.

The timer 210 may count predetermined time intervals for spacing out the individual endothermic reactions. For example, the timer 210 may count down a number of seconds before a first divider of the partition should be breached and an additional number of seconds before a second divider of the partition should be breached. The timer 210 may be pre-set and/or may be modified and reset.

The microprocessor 212 manages signals received from the transceiver 204, the one or more buttons 206, temperature sensor 208, and/or electronic connection 214 and activates the mechanism 202 according to specific criteria, as explained below. The microprocessor 212 may include a printed circuit board (PCB), memory, display and/or indicators 216, inputs, and/or any other electronic components.

The microprocessor 212 may implement aspects of the present invention with one or more computer programs stored in or on computer-readable medium residing on or accessible by the microprocessor 212. Each computer program preferably comprises an ordered listing of executable instructions for implementing logical functions in the microprocessor 212. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The microprocessor 212 may instruct the mechanism 202 to breach one or more dividers of the partition if the temperature sensed by the temperature sensor 208 or the internal temperature sensor of the electronic device 100 is or rises above a predetermined temperature threshold. The microprocessor 212 may also determine the number of dividers to breach based on the difference between the temperature and the predetermined threshold or based on whether the temperature is or rises above one or more subsequent temperature thresholds. The microprocessor 212 may also indicate, via the display or indicators 200, the temperature near the electronic device 100, which dividers are currently being breached, which dividers have previously been breached, how much of the substances is unmixed (and thus how much cooling potential remains in the cartridge), and any other suitable information.

The above-described case 200 provides several advantages over conventional electronic device cases. For example, the user may monitor the temperature near the electronic device 100 via the display or indicators 200 and initiate cooling of the electronic device 100 via a user interface or an input on the electronic device itself or via inputs 206. The case 200 may also monitor the temperature and initiate cooling of the electronic device 100 automatically via the microprocessor 212.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A case for cooling a portable electronic device, the case comprising:
   a housing configured to at least partially enclose the portable electronic device, the housing including a cartridge chamber; and
   a removable cartridge configured to be inserted into the cartridge chamber, the removable cartridge including:
   a first compartment for retaining a first substance therein;
   a second compartment adjacent the first compartment for retaining a second substance therein; and
   a divider separating the first compartment and the second compartment, the divider being configured to be selectively breached when the removable cartridge is positioned in the cartridge chamber such that some of the first substance mixes with some of the second substance so as to generate an endothermic reaction such that the removable cartridge draws heat away from the portable electronic device so as to lower a temperature of the portable electronic device.

2. The case of claim 1, wherein the cartridge chamber is open-ended for removing and/or replacing the removable cartridge.

3. The case of claim 1, wherein the cartridge chamber is positioned in a back side of the housing.

4. The case of claim 1, wherein the first compartment contains water and the second compartment contains ammonium nitrate.

5. The case of claim 1, wherein the divider is configured to be manually breached.

6. The case of claim 1, wherein the housing is configured to insulate the portable electronic device from ambient heat.

7. The case of claim 1, wherein the housing is formed of a thermally insulating material.

8. The case of claim 1, further comprising a breaching mechanism configured to breach the divider.

9. The case of claim 8, wherein the divider is configured to be breached manually or via the breaching mechanism.

10. The case of claim 8, further comprising a timer for triggering the breaching mechanism to breach the divider at a predetermined time.

11. The case of claim 8, further comprising an input for triggering the breaching mechanism to breach the divider for lowering the temperature of the portable electronic device.

12. The case of claim 8, further comprising a transceiver configured to receive a signal representing an instruction for the breaching mechanism to breach the divider such that the breaching mechanism breaches the partition when the transceiver receives the signal.

13. The case of claim 8, further comprising a transceiver configured to receive a first signal representing a temperature of the electronic device and a microprocessor configured to generate a second signal representing an instruction for the breaching mechanism to breach the divider and transmit the second signal to the breaching mechanism if the first signal indicates that the temperature of the portable electronic device has risen above a predetermined threshold such that the breaching mechanism breaches the divider when the breaching mechanism receives the second signal.

14. The case of claim 8, further comprising a temperature sensor configured to sense a temperature near the electronic device and a microprocessor configured to generate a signal when the temperature as sensed by the temperature sensor rises above a predetermined temperature, the signal representing an instruction for the breaching mechanism to breach the divider for lowering the temperature of the portable electronic device.

15. The case of claim 1, wherein the case is configured to hold a smartphone.

16. A case for cooling a portable electronic device, the case comprising:
   a housing configured to at least partially enclose the portable electronic device, the housing including a cartridge chamber; and
   a removable cartridge configured be positioned in the cartridge chamber such that the removable cartridge draws heat away from the electronic device via an endothermic reaction so as to lower a temperature of the portable electronic device when the removable cartridge is positioned in the cartridge chamber, the removable cartridge being configured for selectively controlling a duration and magnitude of the endothermic reaction.

17. The case of claim 16, wherein the removable cartridge is non-reusable.

18. A case for cooling a smartphone, the case comprising:
   a housing configured to at least partially enclose the smartphone, the housing including a cartridge chamber;
   a removable and replaceable cartridge configured to be positioned in the cartridge chamber, the removable and replaceable cartridge including:
      a first compartment configured to retain water therein;
      a second compartment adjacent the first compartment, the second compartment being configured to retain ammonium nitrate therein; and
      a divider separating the first compartment from the second compartment;
   a breaching mechanism configured to selectively breach the divider such that the water mixes with the ammonium nitrate so as to generate an endothermic reaction, the removable and replaceable cartridge being configured to draw heat away from the electronic device via a thermal gradient created by the endothermic reaction so as to lower a temperature of the electronic device; and
   a transceiver configured to receive a signal from the smartphone, the signal representing an instruction for the breaching mechanism to breach the divider such that the breaching mechanism breaches the divider when the transceiver receives the signal.

* * * * *

UNITED STATES PATENT AND TRADEMARK OFFICE
CERTIFICATE OF CORRECTION

| | | |
|---|---|---|
| PATENT NO. | : 10,063,270 B2 | Page 1 of 1 |
| APPLICATION NO. | : 15/459716 | |
| DATED | : August 28, 2018 | |
| INVENTOR(S) | : Joshua Oliver Coulter | |

It is certified that error appears in the above-identified patent and that said Letters Patent is hereby corrected as shown below:

In the Specification

Column 1, Line 4, add:
-- STATEMENT REGARDING FEDERALLY-SPONSORED RESEARCH OR DEVELOPMENT
This invention was made with government support under Contract No.: DE-NA0000622 awarded by the Department of Energy. The government has certain rights in the invention. --

Signed and Sealed this
Twenty-first Day of April, 2020

Andrei Iancu
*Director of the United States Patent and Trademark Office*